(12) United States Patent
Kaupp et al.

(10) Patent No.: US 6,749,167 B2
(45) Date of Patent: Jun. 15, 2004

(54) HOLDER FOR SHAPED BEVERAGE CONTAINERS

(75) Inventors: Klaus Kaupp, Waldachtal (DE); Falk Schaal, Alpirsbach (DE)

(73) Assignee: Fischerwerke Artur Fischer GmbH & Co. KG, Waldachtal (DE)

( * ) Notice: Subject to any disclaimer, the term of this patent is extended or adjusted under 35 U.S.C. 154(b) by 0 days.

(21) Appl. No.: 10/145,536

(22) Filed: May 14, 2002

(65) Prior Publication Data

US 2002/0179796 A1 Dec. 5, 2002

(30) Foreign Application Priority Data

May 16, 2001 (DE) ...................................... 201 08 250 U

(51) Int. Cl.7 ................................................. A47K 1/08
(52) U.S. Cl. ................................. 248/311.2; 248/316.3; 248/313; 248/526; 248/310; 224/926
(58) Field of Search ........................... 248/316.3, 311.2, 248/313, 526, 310; 224/926

(56) References Cited

U.S. PATENT DOCUMENTS

| | | | | | |
|---|---|---|---|---|---|
| 2,851,185 | A | * | 9/1958 | Taylor | 248/346.04 |
| 4,511,072 | A | * | 4/1985 | Owens | 224/549 |
| 4,738,423 | A | * | 4/1988 | DiFilippo et al. | 248/311.2 |
| 5,072,989 | A | * | 12/1991 | Spykerman et al. | 297/188.16 |
| 5,782,448 | A | * | 7/1998 | Withun et al. | 248/311.2 |
| 5,791,618 | A | * | 8/1998 | Lancaster | 248/311.2 |
| 5,890,692 | A | * | 4/1999 | Lee et al. | 248/311.2 |
| 6,076,793 | A | * | 6/2000 | Yamamoto | 248/311.2 |

FOREIGN PATENT DOCUMENTS

| | | |
|---|---|---|
| DE | 296 06 583 U1 | 11/1997 |
| DE | 197 24 599 A1 | 6/1998 |
| DE | 197 29 689 A1 | 1/1999 |

* cited by examiner

*Primary Examiner*—Kimberly Wood
(74) *Attorney, Agent, or Firm*—Michael J. Striker

(57) ABSTRACT

A beverage container holder for a shaped bottle has an insertion opening for insertion of a bottle, a spring element that pivots the diameter-compensating element into the insertion opening, wherein the diameter-compensating element being pivotable downwardly and upwardly.

7 Claims, 4 Drawing Sheets

HOLDER FOR SHAPED BEVERAGE CONTAINERS

BACKGROUND OF THE INVENTION

The present invention relates to a holder for shaped beverage containers.

More particularly, it relates to a holder for holding such shaped beverage containers which have a reduced diameter or a waist above the base. Such holders for beverage containers are intended to be used for installation in a motor vehicle.

Beverage container holders for installation in motor vehicles are known per se. They have an insertion opening for insertion of a beverage container, for example a cup, mug or a beverage can. For adaptation to different diameters of beverage containers, it is known to provide a diameter-compensating flap that is pivotable in the insertion opening. The flap is biased by a spring element and is pivoted by it into the installation opening. When a beverage container is inserted into the insertion opening, the diameter-compensating flap is pressed outwards by the beverage holder against the force of the spring element. The diameter-compensating flap lies under spring bias against the beverage container placed in the insertion opening, in order to support the beverage container and safeguard it against tilting.

The known diameter-compensating flap are suitable for substantially cylindrical or tapering beverage containers, such as cups, mugs or drinks as mentioned above. If a shaped bottle which has a reduced diameter or a waist above the base, is placed in such a beverage container holder, the problem arises that either the diameter-compensating flap is spaced from the waist part of the bottle and consequently does not hold the inserted bottle secure against tilting, or the shaped bottle can be lifted out of the insertion opening because of the diameter-compensating flap does not yield outwards when an attempt is made to lift the bottle out of the insertion opening.

When the bottle is inserted in the insertion opening, the reduction in diameter is located approximately at the level of the diameter-compensating flap. The waist section is normally concavely curved, and between the waist section and the bottle base the diameter of the bottle is larger than in the region of the waist section, normally by virtue of a convex form in that region. Apart from the shaped bottles, other beverage containers that have a waste in the above-described sense are also a possibility of course.

SUMMARY OF THE INVENTION

Accordingly, it is an object of the present invention to provide a holder for a beverage container of the above described type, such that a shaped bottle with a reduced diameter above its base or a waist can be held reliably against tilting and can be removed from the beverage container holder without difficulty.

In keeping with these objects and with others which will become apparent hereinafter, one feature of the present invention resides, briefly stated, in a beverage container holder for a shaped bottle, having an insertion opening for insertion of the bottle, a pivotable diameter-compensating element which is pivotable into the insertion opening, and a spring element that pivots the diameter-compensating element into the insertion opening, wherein in accordance with the present invention the diameter-compensating element is pivotable downwardly and upwardly.

Downwardly shall be understood to be in the insertion direction of the bottle and upwardly shall be understood to mean in the direction of lifting of the bottle out of the beverage container holder. Upwardly and downwardly refer in particular to an intended installation position of the beverage container holder. When a shaped bottle is placed in the beverage container holder in accordance with the present invention, the bottle presses the diameter-compensating element downwards against the force of the spring element and at the same time outwards. Once the bottle has been inserted, the spring element pivots the diameter-compensating element which is arranged at the level of the waist section of the bottle inwards, with the result that the bottle is held secure against tilting in the insertion opening of the beverage container holder.

As the bottle is lifted out, due to its increasing diameter from the waist point downwards to the bottle base, it moves the diameter-compensating element upwards against the force of the spring element and at the same time outwards. Because of the pivotability of the diameter-compensating element, a shaped bottle with the waist can easily be lifted out upwards from the beverage container holder according to the invention. In particular the shaped bottle placed in the beverage container holder, as it is lifted out, is not held by the diameter-compensating element at an area of relatively large diameter between the waist and the bottle base.

The beverage container holder according to the prevent invention preferably has several diameter-compensating elements that are arranged uniformly or non-uniformly distributed around the circumference. In one embodiment of the invention, and a spring element acts on several or all diameter-compensating elements. For example, a spring can be secured at its middle between two diameter-compensating elements, and pivots them both in the insertion opening of the beverage container holder.

Alternatively, a spring element can be of a ring-shaped construction and act on all diameter-compensating elements. The spring element can be, for example, a ring-shaped wire surrounding the diameter-compensating elements, or a ring-shaped leaf spring. In both cases, the spring element forms an open ring which is not necessarily circular.

The spring element can also be a resilient and closed ring, for example a rubber ring. In accordance with one embodiment of the present invention, a spring element is provided for each diameter-compensating element.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1A:
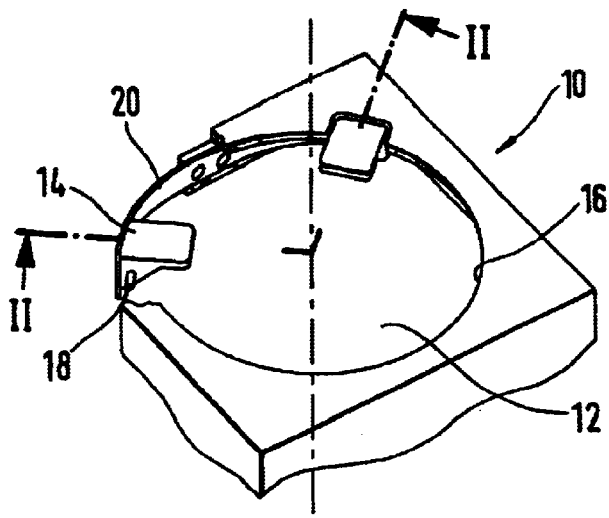
FIGS. 1a–1c are perspective views of a beverage container holder in accordance with the present invention in different positions.
Figure 1B:
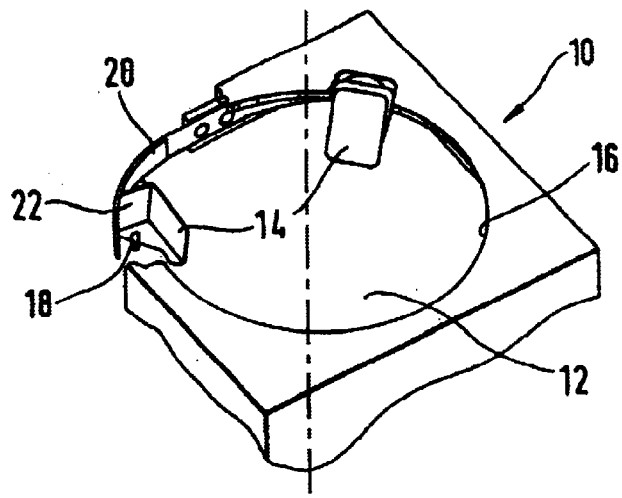

A holder for beverage containers in accordance with the present invention shown in FIG. 1a is identified as a whole with reference numeral 10. It has a circular insertion opening 12 for placement of a beverage container. The beverage container holder 10 has two diameter-compensating elements formed as diameter-compensating flaps 14. The two diameter-compensating flaps 14 are arranged in the region of an edge 16 of the insertion opening 12. The diameter-compensating flaps 14 are offset relative to one another by 90° in a circumferential direction. The diameter-compensating flaps 14 have pivot pins 18 projecting to the side. They lie in complimentary apertures of the beverage container holder 10. The pivot pins 18 define pivot axes of the diameter-compensating flaps 14 that are horizontal and approximately tangential to the edge 16 of the insertion opening 12. The diameter compensating flaps 14 are downwardly and upwardly pivotable.

The beverage container holder 10 in accordance with the present invention has a spring element 20. In the illustrated and the described embodiment of the invention the spring element 20 is formed as a curved leaf spring. The leaf spring is arranged beneath the edge 16 of the insertion opening 12. At its center and midway between the two diameter-compensating flaps 14 it is joined, for example riveted to the beverage container holder 10. Free and resilient ends of the leaf spring forming the spring element 20 lie under bias externally against outer surfaces 22 as shown in FIGS. 1b, 2a–2c. The spring element 20 presses the two diameter-compensating elements 14 resiliently into the starting position shown in FIGS. 1a and 2a, in which the diameter compensating flaps 14 project horizontally into the insertion opening 12.

Figure 2A:
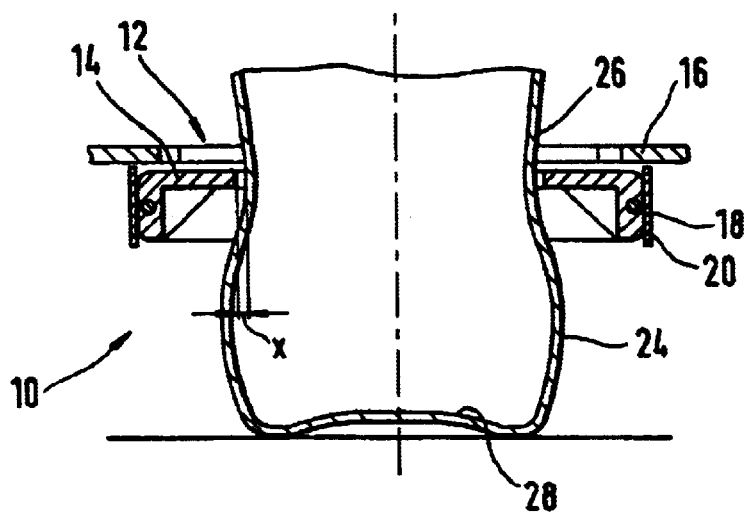
FIGS. 2a–2c are sectional views of the beverage container holder of FIG. 1 taken along the line II—II in FIG. 1 in positions corresponding to the positions of FIGS. 1a–1c.

As shown in FIG. 2a, the beverage container holder 10 in accordance with the present invention is intended for holding a shaped bottle 24. The shaped bottle 24 has a curved point 26 of a reduced diameter or a waist above a bottle base 28. Below the point 26 that is between the point 26 and the bottle base 28, the shaped bottle 24 has a larger diameter. When the bottle diameter 24 has been placed in the insertion opening 12 of the beverage container holder 10, the two diameter-compensating flaps 14 project horizontally inwards into the insertion opening 12 under the action of the spring element 20. The diameter-compensating flaps 14 are located approximately at the level of the point 26 of reduced diameter of the bottle 24, with a slight spacing x between the point 26 of the bottom 24 and the diameter-compensating flaps 14. The bottle 24 is therefore held secure against tilting in the beverage container holder 10.

Figure 1C:
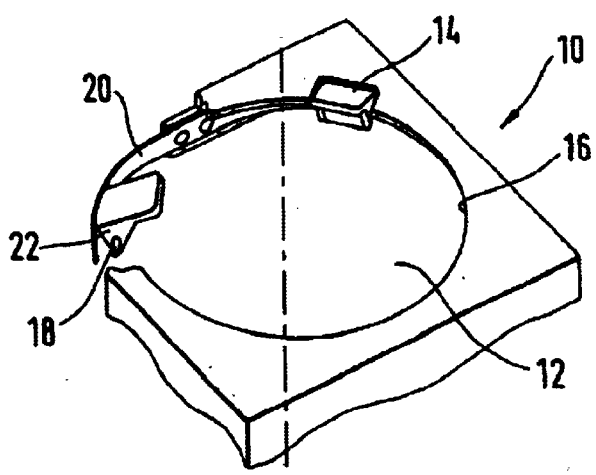
Figure 2B:
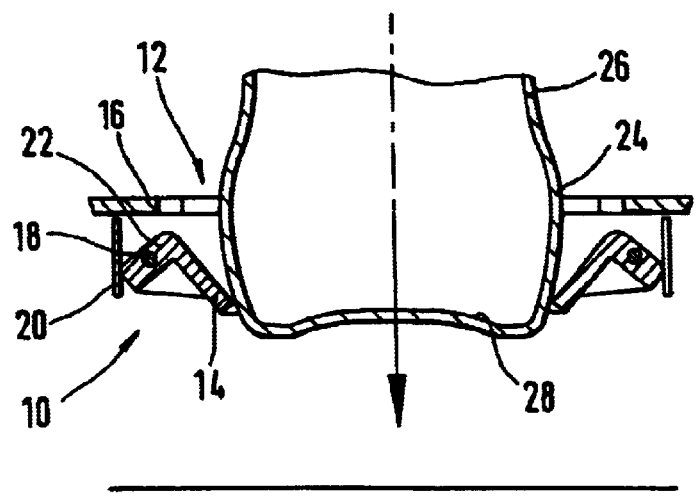
Figure 2C:
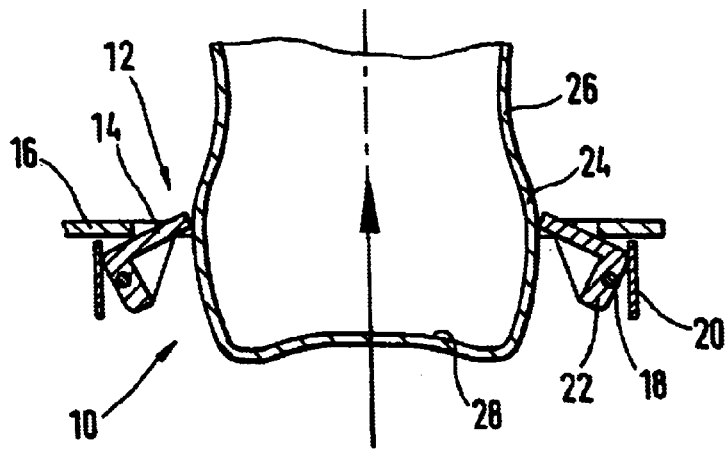

When the bottle 24 is lifted out of the beverage bottle holder 10, with its larger diameter region between the point 26 of reduced diameter and the bottle base 28, it pivots the diameter-compensating flaps 14 upwards against the force of the spring element 20, as illustrated in FIG. 2c. Since the diameter-compensating flaps are upwardly pivotable, they do not prevent the shaped from being lifted out of the beverage bottle holder 10 according to the invention. As soon as the bottle 24 has been lifted fully out of the beverage bottle holder 10, the spring element 20 which presses from the outside against the outer surface 22 of the diameter-compensating flaps 14 pivots the diameter-compensating flaps 14 into their horizontal position again, shown in FIGS. 1a and 2a. The upwardly pivoted position of the diameter-compensating flaps 14 corresponding to FIG. 2c is also shown in FIG. 1c, with the bottle having been omitted from FIG. 1c for the sake of clarity.

When placing the shaped bottle 24 in the insertion opening 12 of the beverage container holder 10 with its larger diameter region between the point 26 and the bottle base 28, the bottle 24 pivots the diameter-compensating flaps 14 downwards against the force of the spring element 20, as shown in FIG. 2b. Once the larger diameter region of the bottle 24 has overcome the diameter-compensating flaps 14, the spring element 20 pressing from the outside against the outer surfaces 22 of the diameter-compensating flaps 14 pivots the diameter-compensating flaps 14 into the horizontal position again, in which the project inwardly into the insertion opening 12. This position is shown in FIGS. 1a and 2a. The upwardly pivoted position of the diameter-compensating flaps 14 is also shown in FIG. 1c, with the bottle having been omitted from FIG. 1c.

Of course, instead of the shaped or waisted bottle 24, other also non-waisted beverage containers, for example mugs, cups or beverage cans, can be placed in the beverage container holder 10 according to the invention.

The beverage container holder 10 according to the invention shown in FIGS. 3a–3c and 4a–4c is substantially of the same construction as the beverage container holder 10 shown in FIGS. 1a–1c and 2a–2c and operates in the same manner, even though the diameter-compensating flaps 14 are of a somewhat modified form on side view. For the following explanation of the beverage container holder 10 shown in FIGS. 3a–3c and 4a–4c, reference is made to the explanations of FIGS. 1a–1c and 2a–2c for supplementary information. The same reference numerals are used for similar components.

The beverage container holder 10 shown in FIGS. 3a–3c and 4a–4c has three diameter-compensating flaps 14 which are arranged uniformly distributed around the circumference at the edge 16 of an insertion opening 12. By means of lateral projecting pivot pins 18, the diameter-compensating flaps 14 are upwardly and downwardly pivotable about pivot axes approximately tangential to the edge 16 of the insertion opening 12. In contrast to the beverage container holder shown in FIGS. 1a–1c and 2a–2c, the beverage container holder shown in FIGS. 3a–3c and 4a–4c has a separate spring element 20 for each diameter-compensating flap 14. The spring elements 20 are formed as leaf springs and arranged upright. They are joined below the diameter-compensating flaps 14 fixedly to the beverage container holder 10. As also shown in FIGS. 1a–1c and 2a–2c, the leaf shaped spring elements 20 of the beverage container holder 10 shown in FIGS. 3a–3c and 4a–4c press resiliently and with bias against outer surfaces 22 of the diameter-compensating flaps 14. Therefore they press the diameter-compensating flaps 14 resiliently into the position projecting horizontally into the insertion opening 12 shown in FIGS. 3a and 4a.

Figure 3A:
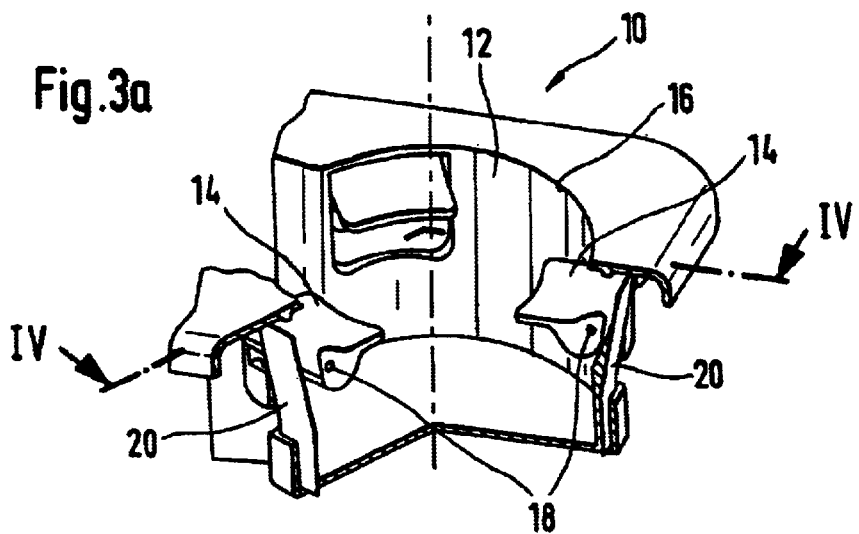
FIGS. 3a–3c are views showing a second embodiment of the beverage container holder in accordance with the present invention in positions corresponding to the positions of FIGS. 1a–1c.
Figure 3B:
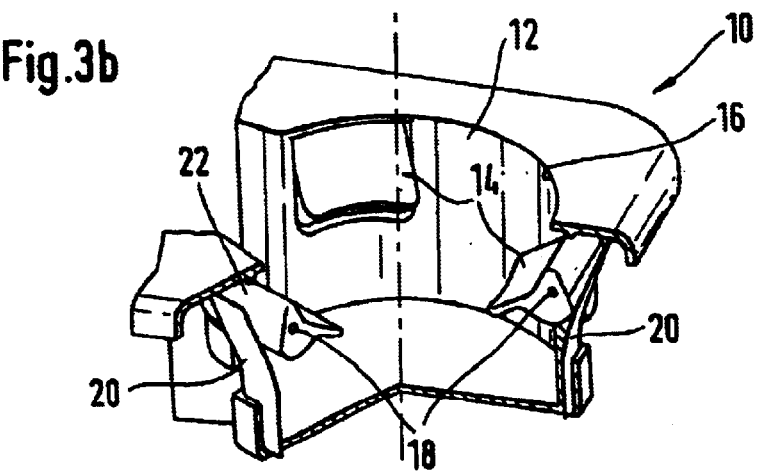
Figure 4A:
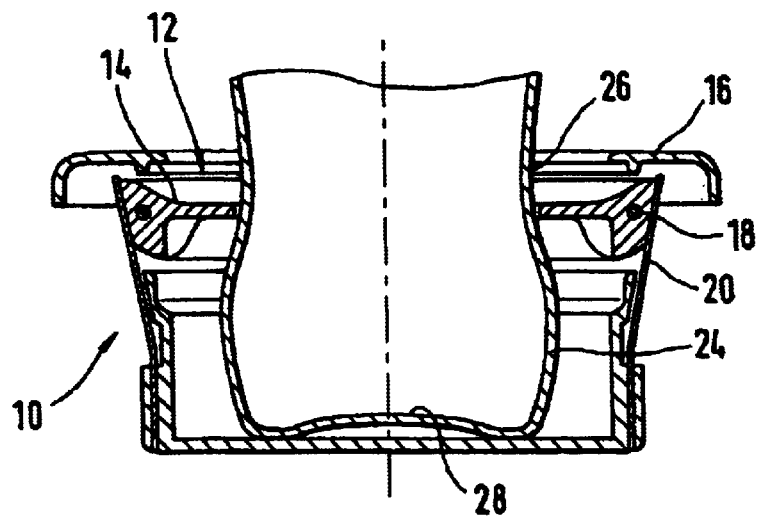
FIGS. 4a–4c are sectional views of the beverage container holder of FIG. 3 taken along the line IV—IV in FIG. 3a in positions corresponding to the positions of FIGS. 3a–3c.
Figure 4B:
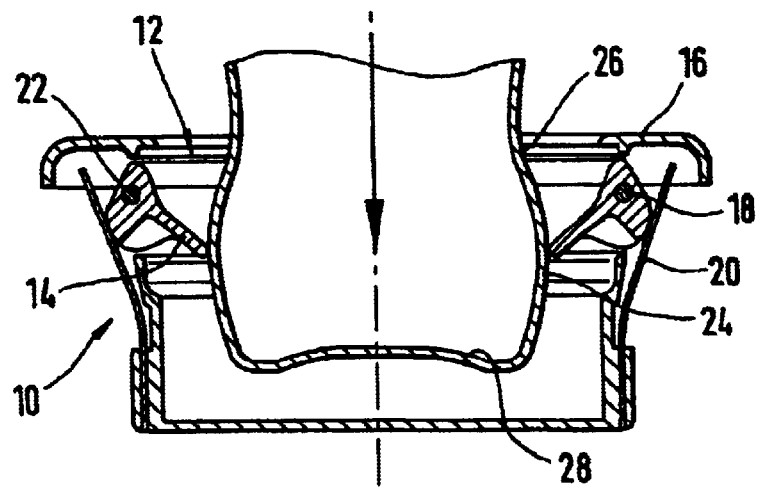

On insertion of the shaped bottle 24, the bottle presses the diameter-compensating flaps 14 against the force of the spring elements 20 into the obliquely downwardly directed position shown in FIGS. 3b and 4b. As soon as the larger diameter region of the bottle 24 located between the waist point 26 and the bottle base 28 has overcome the diameter-compensating flaps 14 and the waist point 26 of the bottle 24 is located at the level of the diameter-compensating flaps 14, the spring elements 20 pivot the diameter-compensating flaps 14 back into the horizontal position projecting into the insertion opening 12, as shown in FIGS. 3a and 4a. The diameter-compensating flaps 14 hold the bottle 24 placed in the beverage container holder 10 at its waist point 26 secure against tilting.

Figure 3C:
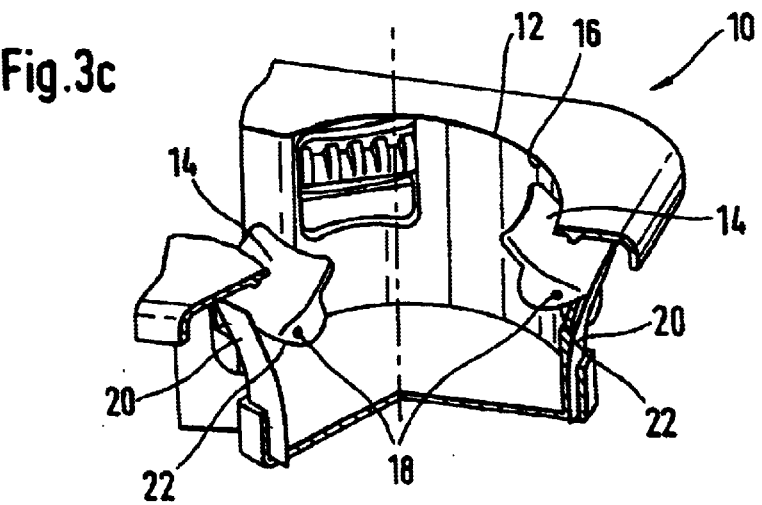
Figure 4C:
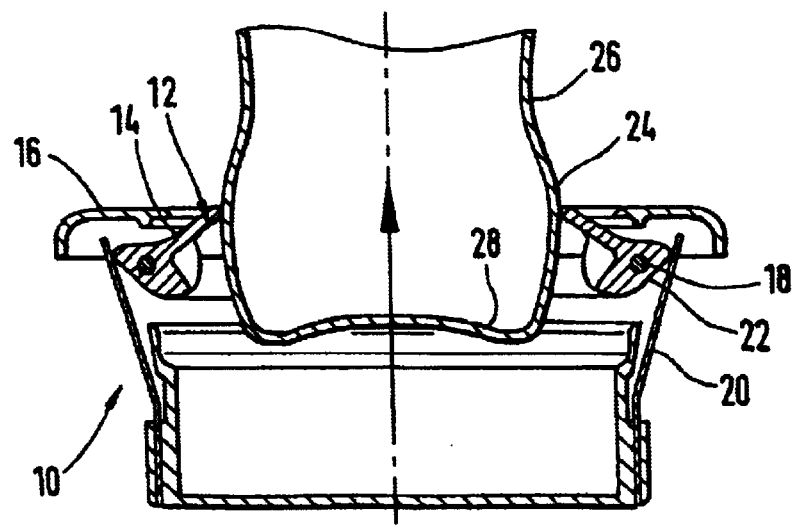

When the bottle 24 is lifted out, its larger diameter region between the waist point 26 and the bottle base 28 pivots the diameter-compensating flap 14 upwards against the force of the spring element 20, as shown in FIGS. 3c and 4c. Once the bottle 24 has been fully out of the beverage container holder 10, the spring elements 20 pivot the diameter-compensating flaps 14 back into the horizontal position projecting into the insertion opening 12.

It will be understood that each of the elements described above, or two or more together, may also find a useful application in other types of constructions differing from the types described above.

While the invention has been illustrated and described as embodied in holder for shaped beverage containers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A beverage container holder for a shaped bottle, comprising means forming an insertion opening for insertion of a bottle, which opening has an axis; a diameter-compensating element; a spring element that pivots said diameter-compensating element into said insertion opening, said diameter-compensating element being pivotable downwardly and upwardly against a spring force of the spring element from a pivotable position in the insertion opening, wherein the diameter-compensating element, upon pivoting upwardly and pivoting downwardly, also pivots outwardly at the same time away from the axis of the insertion opening, and when pivoted upwardly, the diameter-compensating element with its portion extends through the insertion opening and upwardly beyond and above the insertion opening.

2. A beverage container holder as defined in claim 1; and further comprising another such diameter-compensating element, said spring element being formed as a single spring element and pivoting all said diameter-compensating elements into said insertion opening.

3. A beverage container holder as defined in claim 1; and further comprising another such diameter-compensating element, and another such spring element, said spring elements separately pivoting said diameter-compensating elements into said insertion opening.

4. A beverage container holder as defined in claim 1, wherein said spring element is ring-shaped.

5. A beverage container holder as defined in claim 2, wherein said spring element is ring-shaped and surrounds said diameter-compensating elements.

6. A beverage container holder as defined in claim 1, wherein said insertion opening has a substantially vertical axis, said diameter compensating element being pivotable downwardly and upwardly as considered in a direction of said vertical axis of said insertion opening.

7. A beverage container holder for a shaped bottle, comprising means forming an insertion opening for insertion of a bottle, which opening has an axis; a diameter compensating element; a spring element that pivots said diameter-compensating element into said insertion opening, said diameter-compensating element being pivotable downwardly and upwardly against a spring force of the spring element from a pivotable position in the insertion opening, wherein the diameter-compensating element, upon pivoting upwardly and pivoting downwardly, also pivots outwardly at the same time away from the axis of the insertion opening, and when pivoted upwardly, the diameter-compensating element with its portion extends through the insertion opening and upwardly beyond and above the insertion opening, said spring element being formed as a leaf spring.

\* \* \* \* \*